US012800783B2

(12) United States Patent
Han et al.

(10) Patent No.: US 12,800,783 B2
(45) Date of Patent: Nov. 17, 2026

(54) SPATIOTEMPORAL AND SPECTRAL CLASSIFICATION OF ACOUSTIC SIGNALS FOR VEHICLE EVENT DETECTION OVER DEPLOYED FIBER NETWORKS

(71) Applicant: NEC Laboratories America, Inc., Princeton, NJ (US)

(72) Inventors: Shaobo Han, Princeton, NJ (US); Yuheng Chen, South Brunswick, NJ (US); Ming-Fang Huang, Princeton, NJ (US); Tingfeng Li, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 393 days.

(21) Appl. No.: 18/414,419

(22) Filed: Jan. 16, 2024

(65) Prior Publication Data

US 2024/0241275 A1 Jul. 18, 2024

Related U.S. Application Data

(60) Provisional application No. 63/480,369, filed on Jan. 18, 2023.

(51) Int. Cl.

*G01V 1/28* (2006.01)
*G01V 1/00* (2024.01)
*G01V 1/22* (2006.01)
*G08G 1/01* (2006.01)

(52) U.S. Cl.

CPC .............. *G01V 1/288* (2013.01); *G01V 1/001* (2013.01); *G01V 1/226* (2013.01); *G08G 1/0104* (2013.01)

(58) Field of Classification Search

None

See application file for complete search history.

(56) References Cited

U.S. PATENT DOCUMENTS

2015/0248834 A1* 9/2015 Banerjee .................. G08G 1/04 340/943
2020/0174149 A1* 6/2020 Thiruvenkatanathan .................... E21B 47/107
2020/0175851 A1* 6/2020 Serban .................... H04W 4/38

(Continued)

FOREIGN PATENT DOCUMENTS

KR 111157099 A 5/2020

*Primary Examiner* — Huy Q Phan
*Assistant Examiner* — Carl F.R. Tchatchouang
(74) *Attorney, Agent, or Firm* — Vincent Duffy

(57) ABSTRACT

Disclosed are machine learning (ML) based Distributed Fiber Optic Sensing (DFOS) systems, methods, and structures for Sonic Alert Pattern (SNAP) event detection performed in real time including an intelligent SNAP informatic system in conjunction with DFOS/Distributed Acoustic Sensing (DAS) and machine learning technologies that utilize SNAP vibration signals as an indicator. Without installation of additional sensors, vibration signals indicative of SNAP events are detected along a length of an existing optical fiber through DAS. Raw DFOS data is utilized—and not DFOS waterfall data—resulting in faster and more accurate information derivation as rich, time-frequency information in the raw DFOS/DAS waveform data is preserved. A deep learning module Temporal Relation Network (TRN) that accurately detects SNAP events from among chaotic signals of normal traffic is employed, making it reliable when applied to busy roads with dense traffic and vehicles of different speed.

5 Claims, 9 Drawing Sheets

(56) References Cited

U.S. PATENT DOCUMENTS

| | | | | |
|---|---|---|---|---|
| 2020/0190971 | A1* | 6/2020 | Thiruvenkatanathan .................... | G01V 1/288 |
| 2021/0271866 | A1 | 9/2021 | Hayakawa et al. | |
| 2021/0318165 | A1* | 10/2021 | Ozharar ................. | G01H 9/004 |
| 2022/0196463 | A1 | 6/2022 | Han et al. | |

* cited by examiner

CLASSIFICATION PERFORMANCE USING DIFFERENT FEATURES AND MODELS

| | ConvNets | | | TRN | | |
|---|---|---|---|---|---|---|
| | Waveform | PSD | MFCCs | Waveform | PSD | MFCCs |
| TPR(%) | 0.00 | 65.71 | 88.57 | 0.00 | 48.57 | **97.14** |
| FPR(%) | 2.83 | 0.97 | 0.40 | 2.83 | 1.78 | **0.24** |

*FIG. 6*

SPATIOTEMPORAL AND SPECTRAL CLASSIFICATION OF ACOUSTIC SIGNALS FOR VEHICLE EVENT DETECTION OVER DEPLOYED FIBER NETWORKS

CROSS-REFERENCE TO RELATED APPLICATIONS

This application claims the benefit of U.S. Provisional Patent Application Ser. No. 63/480,369 filed Jan. 18, 2023, the entire contents of which is incorporated by reference as if set forth at length herein.

FIELD OF THE INVENTION

This application relates generally to distributed fiber optic sensing (DFOS) systems, methods, structures, and related technologies. More particularly, it pertains to spatiotemporal and spectral classification of acoustic signals for vehicle event detection over deployed fiber networks.

BACKGROUND OF THE INVENTION

Distributed fiber optic sensing (DFOS) technologies including Distributed Acoustic Sensing (DAS), Distributed Vibration Sensing (DVS), and Distributed Temperature Sensing (DTS) are known to be quite useful for sensing acoustic events, vibrational events, and temperatures in a plethora of contemporary applications. Known further, traffic incidents and accidents cause both traffic disruptions and loss of life.

It is therefore of significant societal importance to monitor the status of traffic on roadways to reduce the number of accidents and improve highway productivity. One such approach to highway improvement includes traffic incident detection as traffic incidents not only cause traffic congestion but also increase the probability of producing both primary and secondary accidents. Thus, it is desirable to provide efficient and accurate systems, methods, and structures for monitoring and detecting unusual driving behaviors early and reporting same in real time to avoid further incidents and accidents.

To mitigate traffic incidents and accidents, an increasing number of Sonic Alert Patterns (SNAP) have been deployed along roadways to enhance road safety. However, such SNAP deployments only detect drifting drivers but do not report the drifting drivers to roadway operators.

SUMMARY OF THE INVENTION

An advance in the art is made according to aspects of the present disclosure directed to machine learning (ML) based DFOS systems, methods, and structures for SNAP event detection in real time. Our inventive systems, methods, and structures employe an intelligent SNAP informatic system including DFOS/Distributed Acoustic Sensing (DAS) and machine learning technologies that utilize SNAP vibration signals as an indicator. Without installation of additional sensors, our inventive systems, methods, and structures detect vibration signals along a length of an existing optical fiber through DAS.

In sharp contrast to the prior art which generally employed DFOS waterfall data, our inventive systems, methods, and structures according to aspects of the present disclosure do not require or utilize preprocessing of raw data resulting in much faster and more accurate informational derivation as rich, time-frequency information in raw DFOS/DAS waveform data is preserved.

Systems, methods, and structures according to aspects of the present disclosure employ a deep learning module Temporal Relation Network (TRN) that accurately detects SNAP events from among chaotic signals of normal traffic, making it reliable when applied to busy roads with dense traffic and vehicles of different speed. According to further aspects of the present disclosure, our inventive systems, methods, and structures investigate intrinsic data structures such as transformations and relations along a temporal dimension. Along with Mel-frequency cepstral coefficients (MFCCs) features extracted from raw waveforms, our systems, methods, and structures advantageously outperform other systems and methods that employ different models, such as convolutional neural network (CNN) and features such as power spectral density (PSD) and raw waveform. Moreover, TRN employ temporal reasoning by explicitly learning changes of spectral intensity over locations and time.

BRIEF DESCRIPTION OF THE DRAWING

FIG. 2(A) pattern matching of waterfall images and FIG. 2(B) DAS data used to capture spectral information of SNAP events according to aspects of the present disclosure;

FIG. 6 Illustrates classification performance using different features and models according to aspects of the present disclosure.

DETAILED DESCRIPTION OF THE INVENTION

Figure 1A:
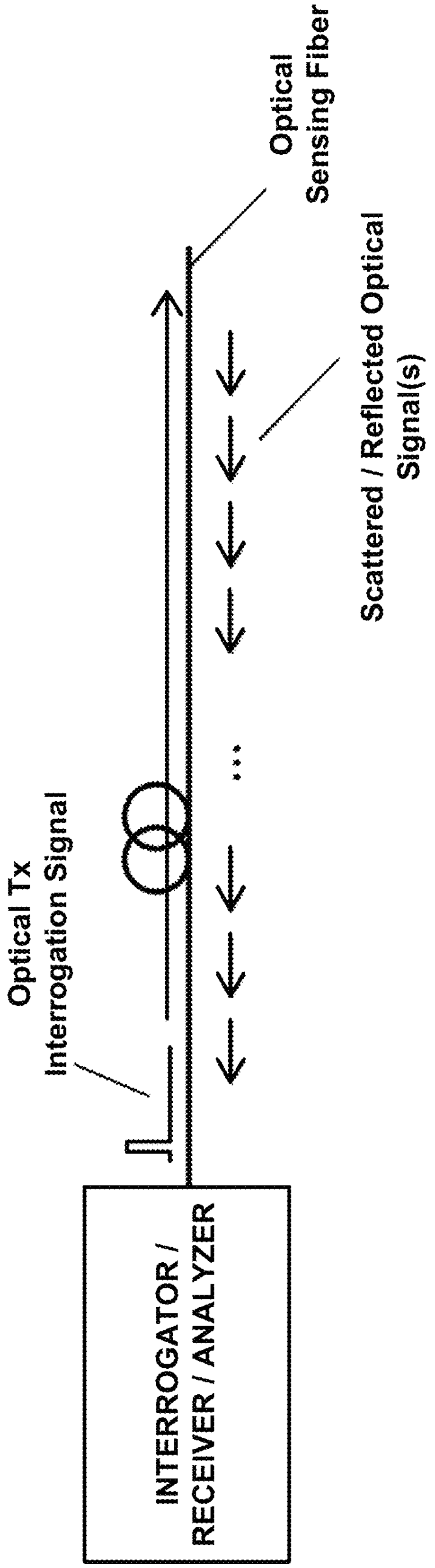
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
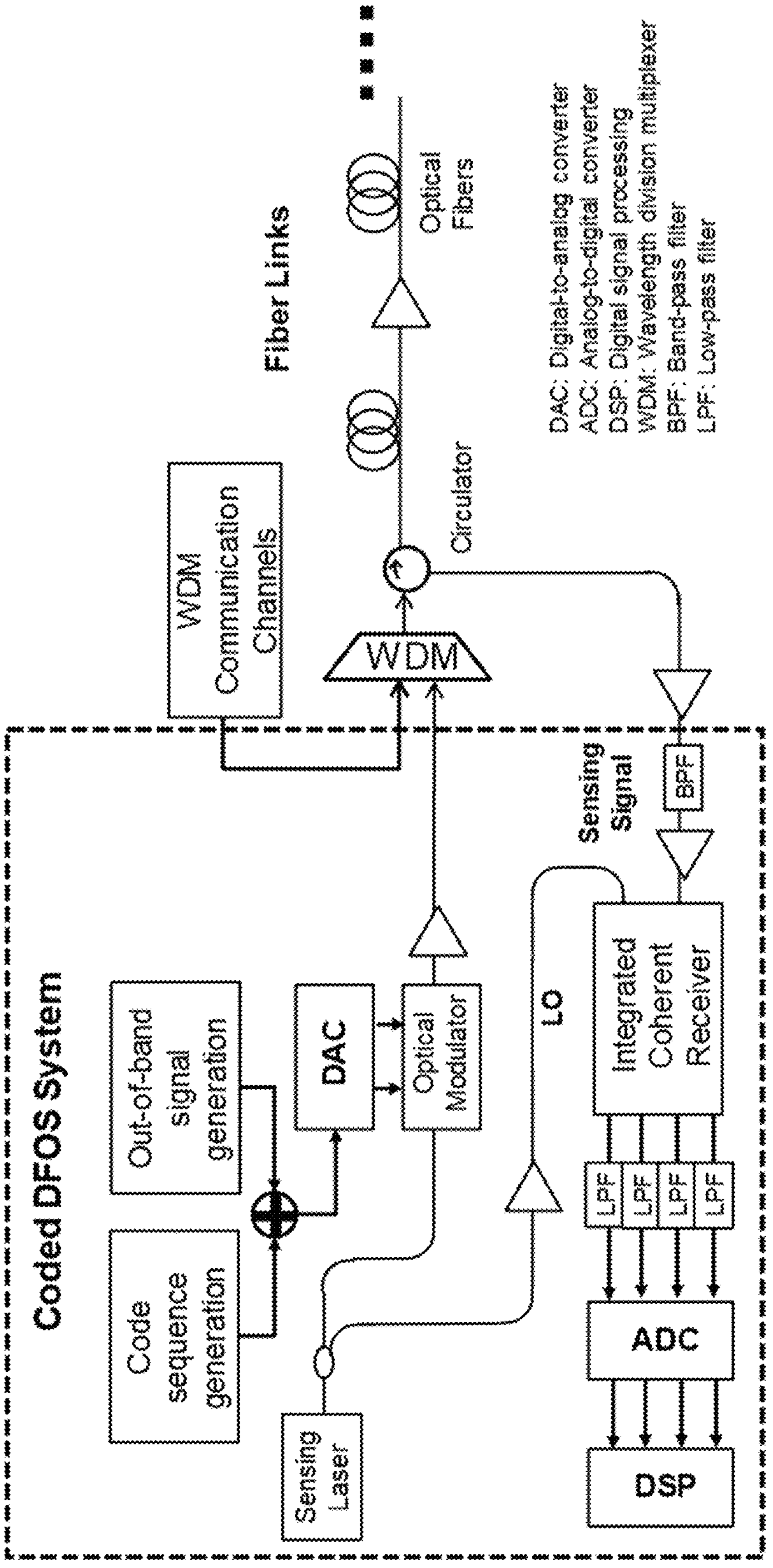

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

As we shall now further show and describe systems, methods, and structures according to aspects of the present invention employ machine learning for SNAP event detection using waveform data collected from a DFOS system in real-time. An algorithm employed learns distinctive patterns by comparing normal traffic signals SNAP events.

According to aspects of the present disclosure and in sharp contrast to the prior art, our inventive systems, methods, and structures employ temporal relational reasoning techniques instead of pattern matching methods. Visually, patterns generated by normal driving signal and SNAP event looks very similar, while they may exhibit intrinsic patterns when analyzing along a temporal dimension which can be captured by Temporal Relation Network (TRN) module.

First, there exists order information in actions of wheels passing SNAP stripes, which is discriminative to the actions of a wheel driving on the ground during normal driving. The change of spatial intensity over time manifests the driving speed, which is inherently related to the characteristic frequency of a SNAP vibration.

Second, heterogeneous factors such as driving speed, tire size, and length of wheelbase can all affect the time axis of a SNAP signal. The TRN extracts frames from a long sequence of data and focuses on relationships between segments of waveform data, which can be more robust to variability along the time-scale. Meanwhile, it also reduces the computation load than inference on the whole waveform data, supporting real-time inference with limited local computing resource.

Finally, in contrast to considering a spatial-temporal patch as a 1D "video", we use Mel-frequency cepstral coefficients (MFCCs) features, which is a representation of the short-term power spectrum of an acoustic signal. This feature concisely describes the overall shape of a spectral envelope, which captures the characteristic vibration patterns in the frequency domain.

The coefficients output by MFCCs of multiple locations forms an "image", and the time dimension is a series, which would be further processed to get the representation and learned by TRN module. Augmenting with the spatial dimension, MFCCs provide a 3D representation of the short-term power spectrum of acoustic signals, which allows for joint reasoning between driving speed and vibration frequency.

Figure 2A:
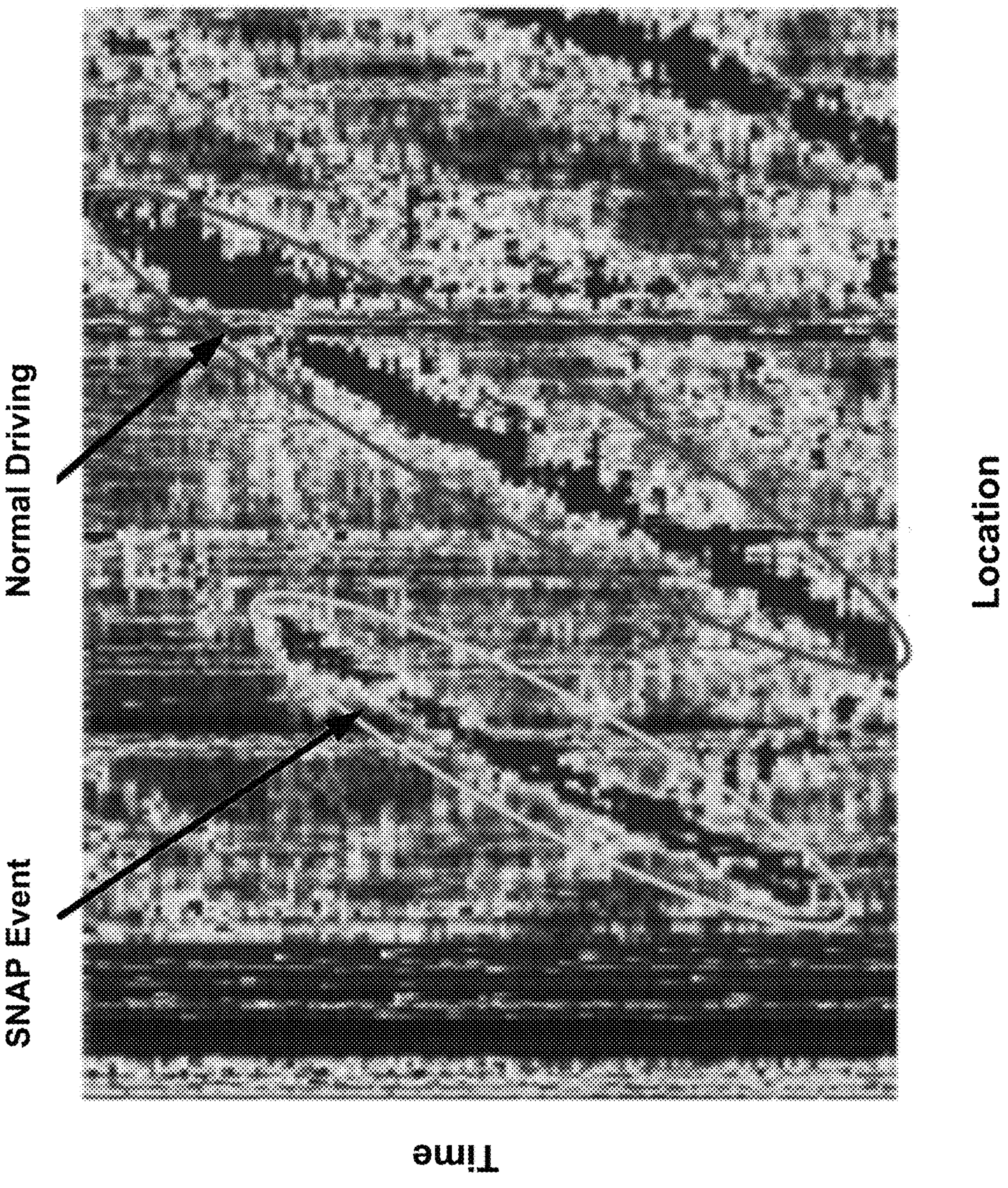
FIG. 2(A) and FIG. 2(B) are plots showing.
Figure 2B:
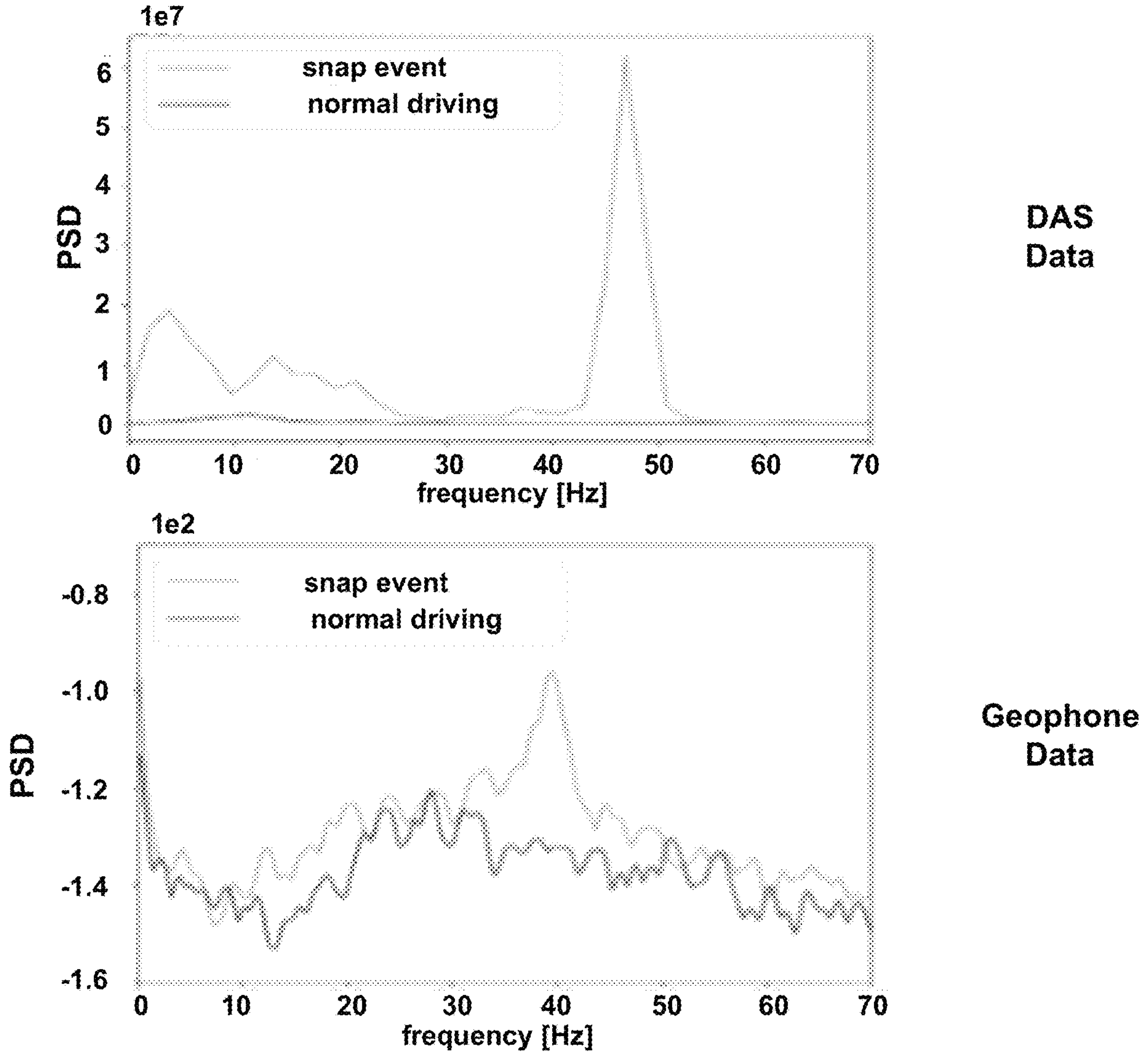

FIG. 2(A) and FIG. 2(B) are plots showing: FIG. 2(A) pattern matching of waterfall images and FIG. 2(B) DAS data used to capture spectral information of SNAP events according to aspects of the present disclosure.

As will become further apparent, our inventive systems, methods, and structures according to aspects of the present disclosure employ raw DAS waveform (2 kHz), while previous, prior-art approaches employ only 8 Hz waterfall data.

Our inventive systems, methods, and structures perform spatio-temporal and spectral classification, while previous, prior-art approaches employ convolutional neural networks, which only perform pattern-matching in spatial-temporal classification.

Finally, with TRN, our inventive model explicitly compares what is different between 2 time-frames, in both the location peak and the frequency peak of the vibration signal. It performs temporal reasoning between driving speed and vibrating frequency. The (visually similar) SNAP signal and driving signal are quite different in this regard.

Figure 3:
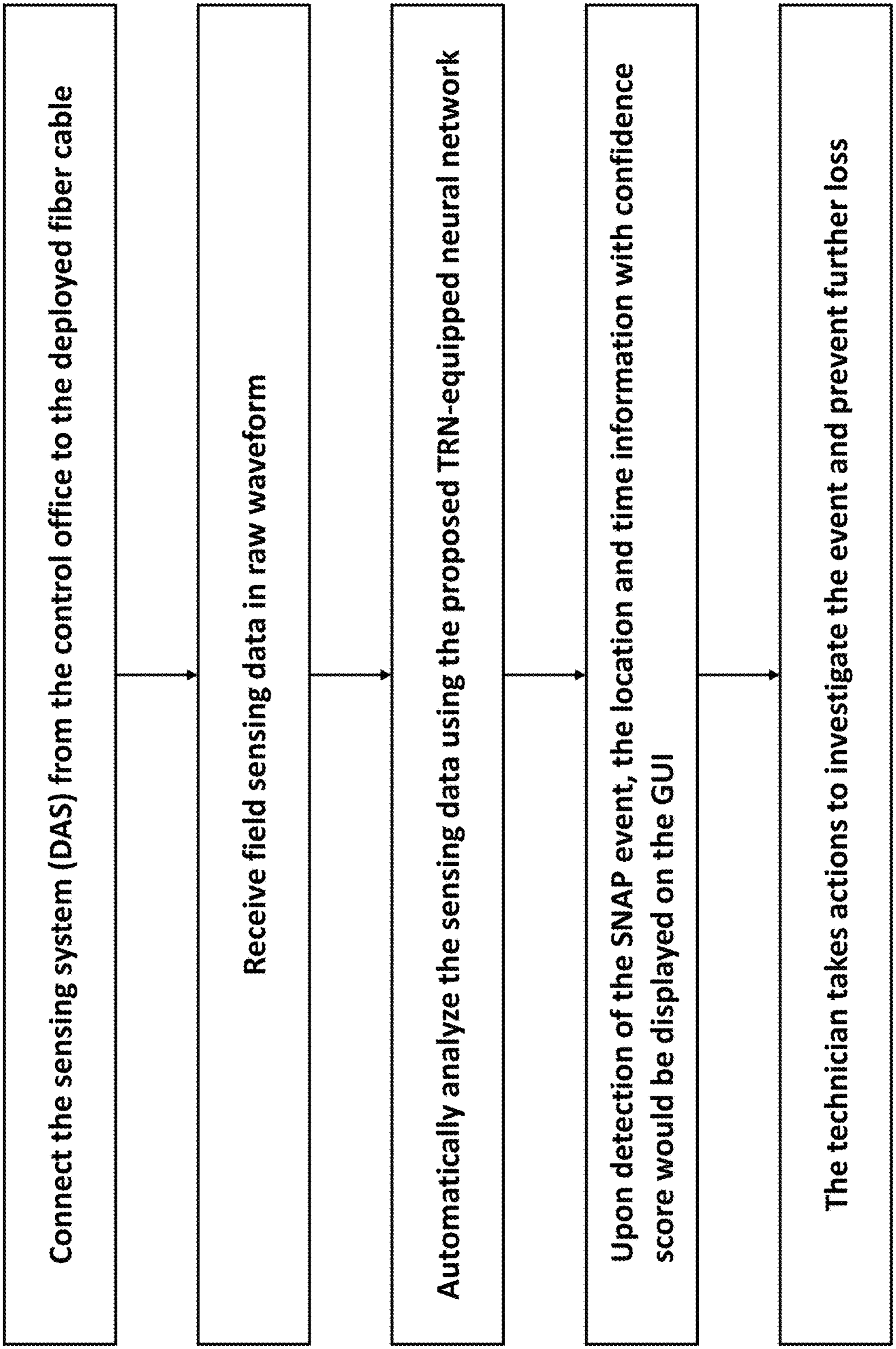
FIG. 3 is a schematic flow diagram showing illustrative DFOS based SNAP event detection using waveform data according to aspects of the present disclosure.

FIG. 3 is a schematic flow diagram showing illustrative DFOS based SNAP event detection using waveform data according to aspects of the present disclosure. With reference to that figure, it may be observed that a DFOS/DAS sensing system is deployed in which a fiber optic sensor cable is located proximate to a roadway at least a portion of which includes SNAP features located thereon/therein. The DFOS/DAS system is operated and vibrational sensing data in raw waveform is received/detected/recorded. The vibrational sensing data is automatically analyzed using a Temporal Relation Network (TRN)—equipped neural network. Upon detection of a SNAP event, a location and time information along with confidence score is determined and communicated to operators—or other systems. Based upon that detection parameters, a technician or other personnel may be dispatched to the event location.

Intuitively, the waveform itself forms a time series, as each patch represents locations along the length of the DFOS sensor fiber by time. However, in a real traffic scenario, the relations may look more similar between a SNAP patch and a normal traffic patch. In order to solve this, we extract MFCCs feature for each fifo point, and form a 2D “image” when combining multiple fifos.

Figure 4:
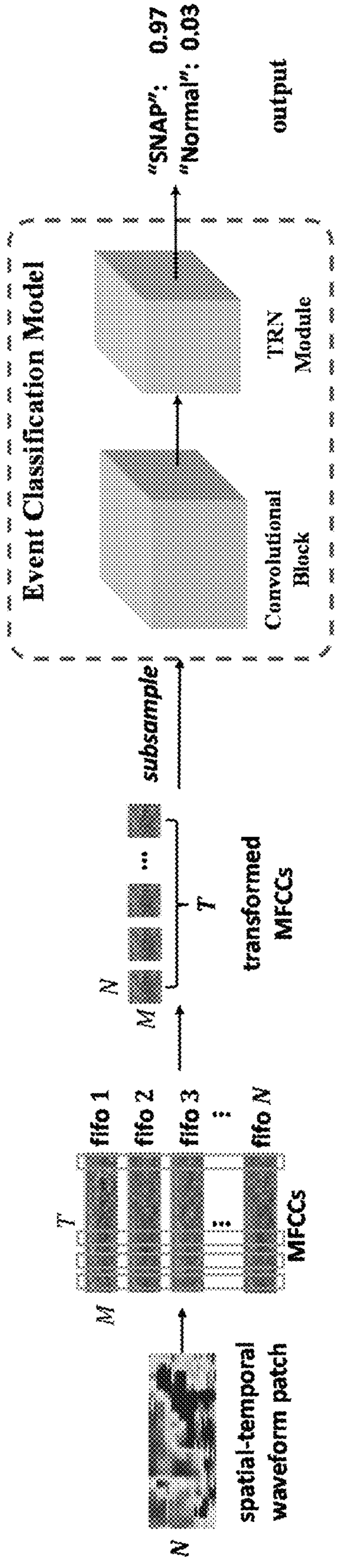
FIG. 4 is a schematic diagram showing illustrative architecture of TRN event classification model for SNAP event detection according to aspects of the present disclosure.

FIG. 4 is a schematic diagram showing illustrative architecture of TRN event classification model for SNAP event detection according to aspects of the present disclosure.

With reference to the summarized model shown therein, the MFCCs features are first extracted from the input waveform patch, then transformed and subsampled as a sequence of features for the model input. The following event classification model including convolutional block for high-level feature extraction for each input in the sequence, and a TRN module to capture the temporal relations within the sequence. The final output provides the probability of each category that the patch being classified as.

Specifically, each MFCCs feature of a fifo is M×T, where T is time and M is number of coefficients. For N fifos, it forms a N×M×T tensor. After concatination and reshaping to T×M×N, it can be seen as a “video” with T frames and M×N “image” size. To model the temporal relations between adjacent “frames”, we adopt TRN module. A pairwise temporal relation can be defined as $$T_2(I) = h_\phi(\Sigma_{i<j} g_\theta(f_i, f_j)), \quad (1)$$

where the input is the “video” I we synthesized, with n selected ordered “frames” as $I=\{f_1, f_2, \ldots, f_n\}$, where $f_i$ is a representation of the $i^{th}$ “frame”. The function $h_\phi$ and $g_\theta$ fuse features of different ordered “frames”. We use multilayer perceptrons (MLP) with parameters $\phi$ and $\theta$ respectively. The definiton can be further extened to higher row relations such as 3-frame relation function $$T_3(I) = h'_\phi(\Sigma_{i<j<k} g'_\theta(f_i, f_j, f_k)), \quad (2)$$

When events are completed and cannot be captured by single scale relations, we can use the following function to accumulate relations at different scales $$MT_L(I) = T_2(I) + T_3(I) \ldots + T_L(I), \quad (3)$$

Where $T_d$ captures temporal relationships between d ordered “frames”. All the relation functions are end-to-end trainable with base CNN.

Figure 5:
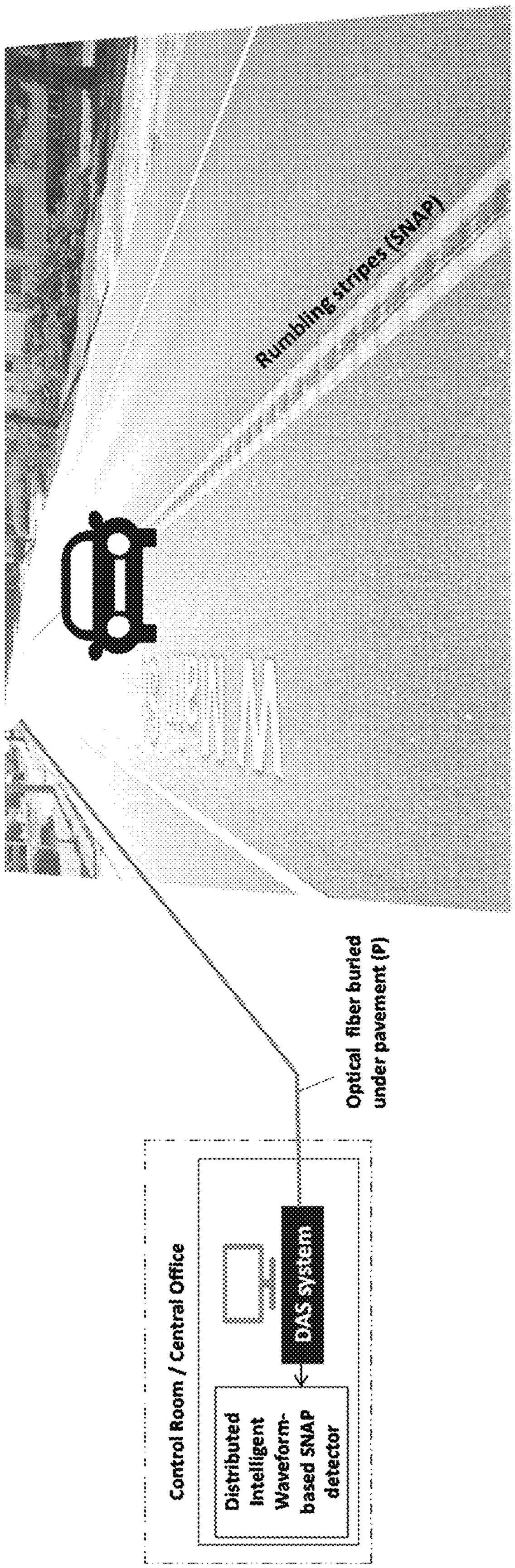
FIG. 5 is a schematic diagram showing illustrative layout of a waveform-based SNAP event detection according to aspects of the present disclosure.

FIG. 5 is a schematic diagram showing illustrative layout of a waveform-based SNAP event detection according to aspects of the present disclosure.

System Layout

As may be observed in FIG. 5 which shows the configuration of a sensing layer overlaid on deployed fiber. A DFOS/Distributed Acoustic Sensor (DAS) and Distributed Intelligent Waveform-based SNAP detector are in a control office/central office for remote monitoring of the entire optical fiber cable route. The DFOS/DAS system is connected to the field optical fiber to provide sensing functions. The existing rumbling (rumble) strips are deployed/formed on/in the pavement between lanes. As will be readily understood by those skilled in the art, when a vehicle passes over the rumbling strips, vibration signals are created that may be detected by the DFOS/DAS operation.

Overall Training and Inference Procedure

[Data collection] A target vehicle is driven in the field, with GPS and video camera recording the SNAP engagement or crossing events. Multiple rounds of data collection from multiple routes are preferred.

[Data annotation] Labeling the SNAP events by linking the DAS waveform to the GPS and video time stamp as the positive class. The DFOS/DAS waveforms collected from no-snap segments of the road serve as a negative class.

[Model training] During the training phase, following a conventional supervised training procedure, the TRN model is trained with label and patch pairs. When training the TRN model, we subsampled the input for better efficiency. After obtaining the T×M×N transformed MFCCs feature, first uniformly generate T' segment and randomly sample one feature from each segment along the first axis, resulting T'×M×N tensor as model input. This largely accelerates training procedure comparing to using the entire sequence of features.

[Inference] During the inference phase, the input raw waveform data are converted to local patches by applying sliding windows with overlaps. The patches are then classified by the trained TRN model to determine if a SNAP event exists within the patch. The identified windows containing SNAP events are then merged into one single box via a boxes fusion step. The timestamp, cable location, event type, and confidence score are provided as output.

Experiment Validation

We collected data from multiple independent runs. During one of the independent runs, we collected data from 330 m to 600 m we performed three groups of runs to cover multiple situations: (1) group 1, trying to pass the SNAP for the entire SNAP section, 20 runs; (2) group 2, passing SNAP only at two locations, i.e., 330 m and 600 m, 20 runs; (3) few passing events between 2050 m and 2225 m, 2 runs. Each individual run was conducted at different speeds.

We then manually annotated the SNAP patches by cropping along the entire SNAP pattern. We then conducted 8 runs from 326 m to 4863 m, covering 7 segments of SNAP sections. As it is hard to distinguish SNAP patterns to normal traffic patterns on waveform data, we only sample negative patches within non-SNAP regions from this data. We randomly sampled from all positive and negative patches, resulting 4936 and 1235 patches in training and test set.

We compared our method with different baselines in terms of the model and feature(s) being used. We compared different features include (1) waveform, the raw output from DAS system; (2) PSD, Power Spectral Density vector of waveform with cropped frequency between 75 HZ and 250 HZ; and (3) MFCCs, MFCCs feature vector as described previously. We also compared the TRN model with conventional CNN models. The results are shown in FIG. 6, from which we can find that using MFCCs is better than PSD and waveform. And that using waveform results in all SNAP patches are predicted as normal. Besides, TRN models usually perform better than CNN models, indicating its capability of leveraging intrinsic data structure along temporal dimension to make correct predictions.

Figure 7:
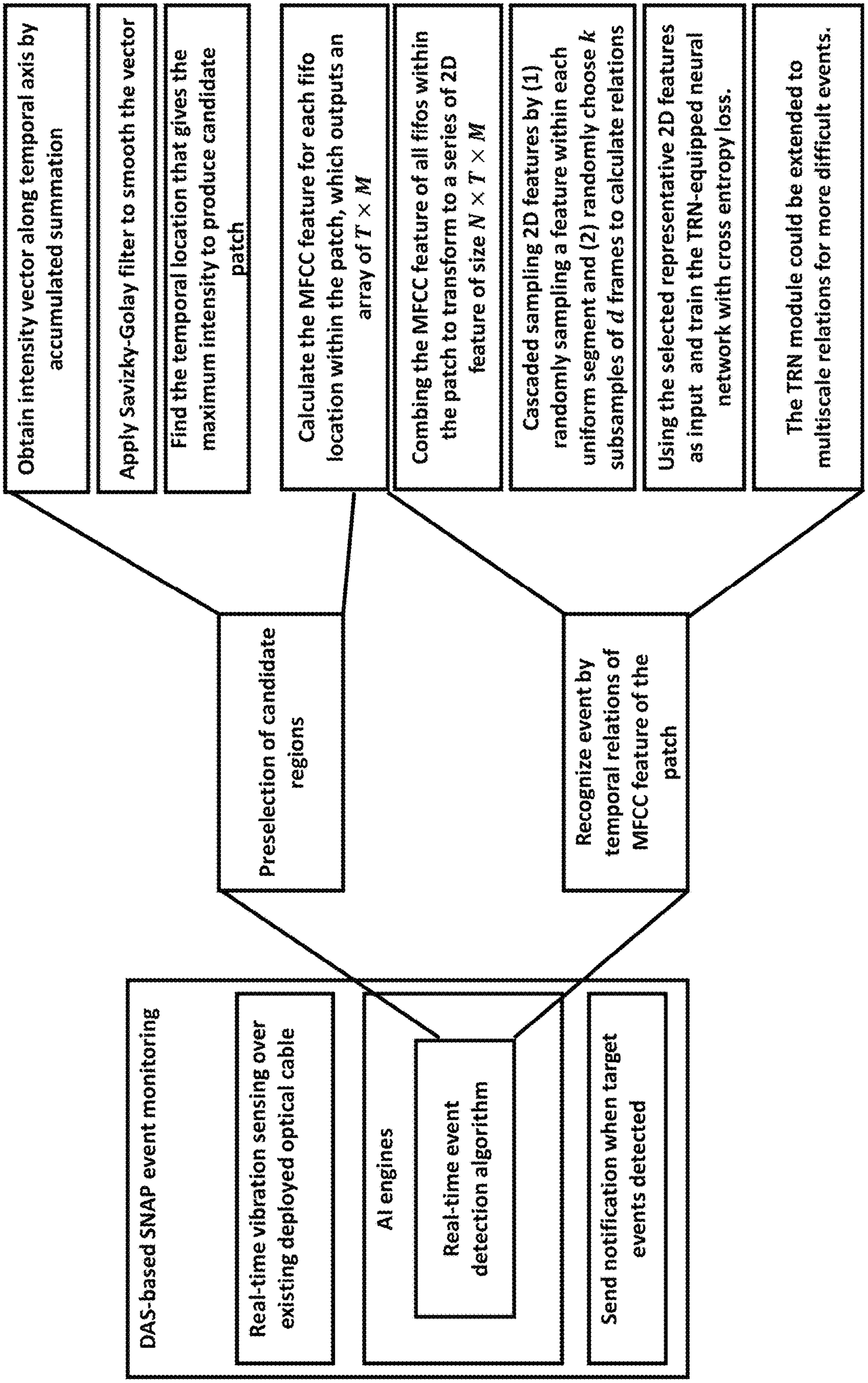
FIG. 7 is a schematic diagram showing illustrative operation of SNAP event detection according to aspects of the present disclosure.

FIG. 7 is a schematic diagram showing illustrative operation of SNAP event detection according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for a spatiotemporal and spectral classification of acoustic signals for vehicle event detection over deployed fiber networks, the method comprising:

operating a distributed fiber optic sensing system (DFOS);

collecting field sensing data in raw waveform resulting from the operation of the DFOS system;

automatically analyzing the field sensing data using a temporal relation network (TRN) equipped neural network such that sonic alert pattern (SNAP) events are detected, wherein the automatic analysis includes using mel-frequency cepstral coefficients (MFCCs) that are representations of short term power spectrum of an acoustic signal indicative of the detected SNAP events to extract temporal frequency information from DFOS raw waveform; and generating location and time information along with a confidence score for the detected SNAP events, wherein the TRN relates driving speed and vibration frequency for classifying the detected SNAP events and normal driving conditions.

2. The method of claim 1 wherein the detected SNAP events are one or more driving behaviors including lane drift, off-road, aggressive, erratic, emergency stop, shoulder stop, and double line crossing.

3. The method of claim 2 further comprising providing a real-time notification to a technician of the location and time information along with the confidence score for the detected SNAP events.

4. A non-transitory computer-readable medium storing instructions that, when executed by a processor, cause the processor to perform operations for a spatiotemporal and spectral classification of acoustic signals for vehicle event detection over deployed fiber networks, the operations comprising:

receiving field sensing data in raw waveform captured from an operating distributed fiber optic sensing system (DFOS);

automatically analyzing the field sensing data using a temporal relation network (TRN) equipped neural network such that sonic alert pattern (SNAP) events are detected, wherein the automatic analysis includes using mel-frequency cepstral coefficients (MFCCs) that are representations of a short term power spectrum of an acoustic signal indicative of the detected SNAP events to extract temporal frequency information from the DFOS raw waveform; and generating location and time information along with a confidence score for the detected SNAP events, wherein the TRN relates driving speed and vibration frequency for classifying the detected SNAP events and normal driving conditions.

5. A system for vehicle event detection over deployed fiber networks, the system comprising:

a distributed fiber optic sensing system (DFOS) configured to collect field sensing data in raw waveform;

a processor; and a memory storing instructions that, when executed by the processor, cause the system to:

automatically analyze the field sensing data using a temporal relation network (TRN) equipped neural network such that sonic alert pattern (SNAP) events are detected, wherein the automatic analysis includes using mel-frequency cepstral coefficients (MFCCs) that are representations of a short term power spectrum of an acoustic signal indicative of the detected SNAP events to extract temporal frequency information from the DFOS raw waveform; and generate location and time information along with a confidence score for the detected SNAP events, wherein the TRN relates driving speed and vibration frequency for classifying the detected SNAP events and normal driving conditions.

* * * * *